United States Patent
Torii et al.

(10) Patent No.: US 9,292,745 B2
(45) Date of Patent: Mar. 22, 2016

(54) OBJECT DETECTION APPARATUS AND METHOD THEREFOR

(71) Applicant: CANON KABUSHIKI KAISHA, Tokyo (JP)

(72) Inventors: Kan Torii, Tokyo (JP); Kenji Tsukamoto, Kawasaki (JP); Atsushi Nogami, Tokyo (JP); Kaname Tomite, Yokohama (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 13/836,221

(22) Filed: Mar. 15, 2013

(65) Prior Publication Data

US 2013/0259307 A1     Oct. 3, 2013

(30) Foreign Application Priority Data

Mar. 30, 2012 (JP) ................................. 2012-082380

(51) Int. Cl.
     *G06K 9/00* (2006.01)

(52) U.S. Cl.
     CPC ........ *G06K 9/00624* (2013.01); *G06K 9/00369* (2013.01)

(58) Field of Classification Search
None
See application file for complete search history.

(56) References Cited

U.S. PATENT DOCUMENTS

| | | | |
|---|---|---|---|
| 2005/0104727 A1* | 5/2005 | Han et al. ....................... | 340/541 |
| 2005/0147304 A1* | 7/2005 | Nagahashi et al. ........... | 382/190 |
| 2006/0126941 A1* | 6/2006 | Higaki .......................... | 382/190 |
| 2008/0123968 A1* | 5/2008 | Nevatia et al. ................ | 382/228 |
| 2009/0041297 A1* | 2/2009 | Zhang et al. .................. | 382/103 |
| 2009/0087100 A1* | 4/2009 | Hu ................................. | 382/190 |
| 2009/0238454 A1* | 9/2009 | Hang et al. .................... | 382/167 |
| 2009/0296989 A1* | 12/2009 | Ramesh et al. ............... | 382/103 |
| 2010/0158325 A1* | 6/2010 | Piramuthu et al. ............ | 382/118 |
| 2010/0296697 A1* | 11/2010 | Ikenoue ......................... | 382/103 |

(Continued)

FOREIGN PATENT DOCUMENTS

WO    WO/2012/053311    * 4/2012 ................ G06T 1/00

OTHER PUBLICATIONS

Lin et al. "Shape-Based Human Detection and Segmentation via Hierarchical Part-Template Matching," Pattern Analysis and Machine Intelligence, IEEE Transactions on (vol. 32 , Issue: 4) 2010.*

(Continued)

*Primary Examiner* — Vu Le
*Assistant Examiner* — Alexander J Lesnick
(74) *Attorney, Agent, or Firm* — Canon U.S.A., Inc. IP Division

(57) ABSTRACT

An object detection apparatus includes a first detection unit configured to detect a first portion of an object from an input image, a second detection unit configured to detect a second portion different from the first portion of the object, a first estimation unit configured to estimate a third portion of the object based on the first portion, a second estimation unit configured to estimate a third portion of the object based on the second portion, a determination unit configured to determine whether the third portions, which have been respectively estimated by the first and second estimation units, match each other, and an output unit configured to output, if the third portions match each other, a detection result of the object based on at least one of a detection result of the first or second detection unit and an estimation result of the first or second estimation unit.

14 Claims, 20 Drawing Sheets

(56) References Cited

U.S. PATENT DOCUMENTS

| | | | |
|---|---|---|---|
| 2011/0050938 A1* | 3/2011 | Capata et al. | 348/222.1 |
| 2011/0274315 A1* | 11/2011 | Fan et al. | 382/103 |
| 2011/0279685 A1* | 11/2011 | Alahi et al. | 348/187 |
| 2013/0230217 A1* | 9/2013 | Ueki | 382/118 |

OTHER PUBLICATIONS

Mikolajczyk et al. "Human Detection Based on a Probabilistic Assembly of Robust Part Detectors,": ECCV 2004, LNCS 3021, pp. 69-82, 2004.*

Ueki, machine translation of WO/2012/053311 (JP2011071562), published on Apr. 26, 2012.*

Takayoshi et al.; 'Improved Part-based Human Detection Using Depth Information'; The transactions of the Institute of Electrical Engineers of Japan. D, vol. 131, No. 4 (2011).

"Rapid Object Detection using a Boosted Cascade of Simple Features" by P. Viola and M. Jones, IEEE Conference on Computer Vision and Pattern Recognition (2001).

"Histograms of oriented gradients for human detection." by Dalal, N., & Triggs, B, IEEE CVPR (2005).

"Probabilistic Outputs for Support Vector Machines and Comparisons to Regularized Likelihood Methods." by Platt, J. C., Advances in Large Margin Classifiers. (1999).

"Transforming classifier scores into accurate multiclass probability estimates." by Zadrozny, B., & Elkan, C., Proceedings of the Eighth ACM SIGKDD International Conference on Knowledge Discovery and Data Mining. (2002.

"A Discriminatively Trained, Multiscale, Deformable Part Model" by P.Felzenszwalb, D. McAllester, and D. Ramanan, IEEE Conference on Computer Vision and Pattern Recognition (2008).

http://opencv.willowgarage.com/wiki/.

* cited by examiner

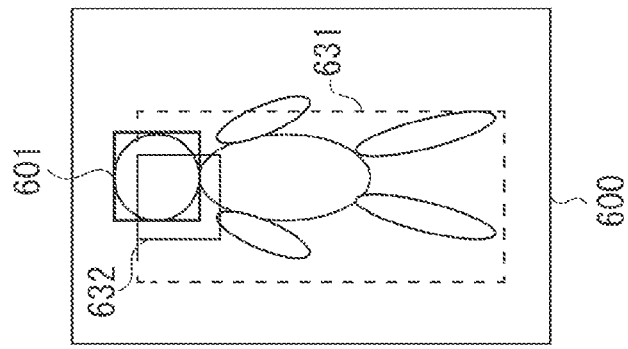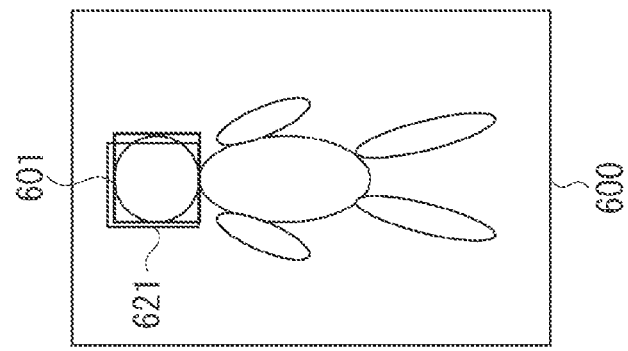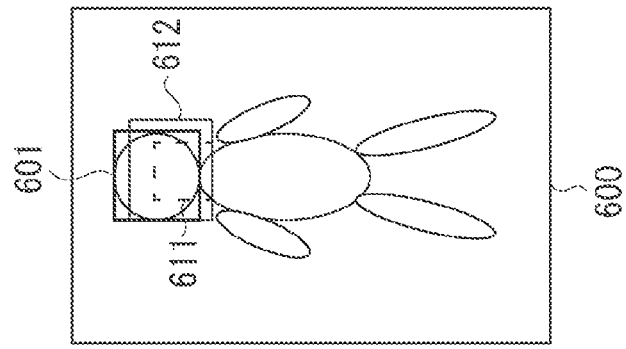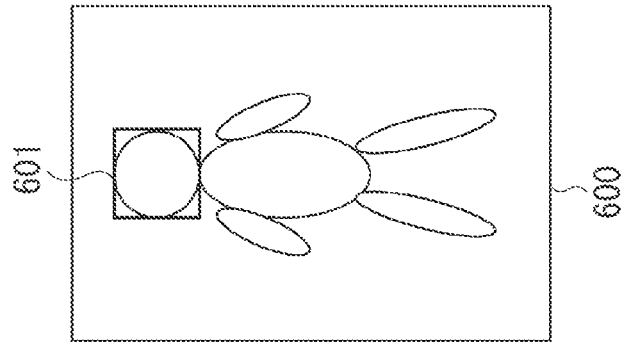

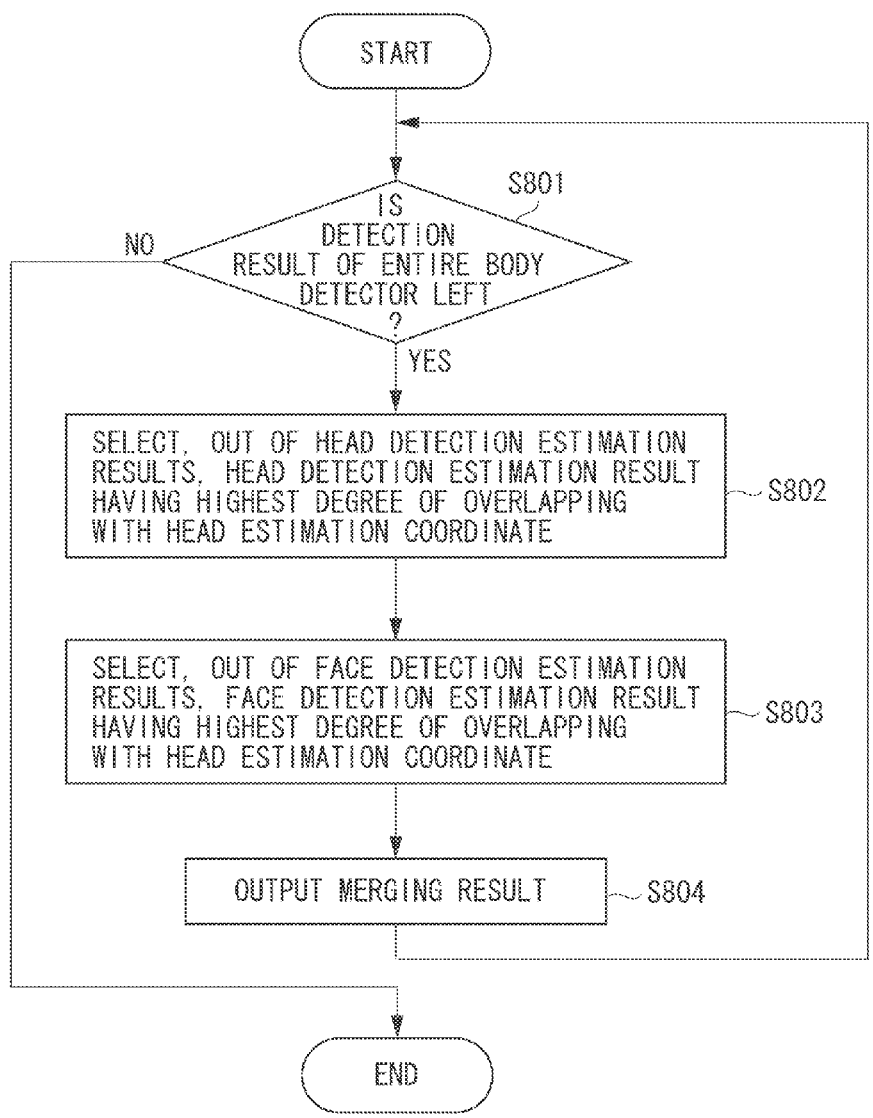

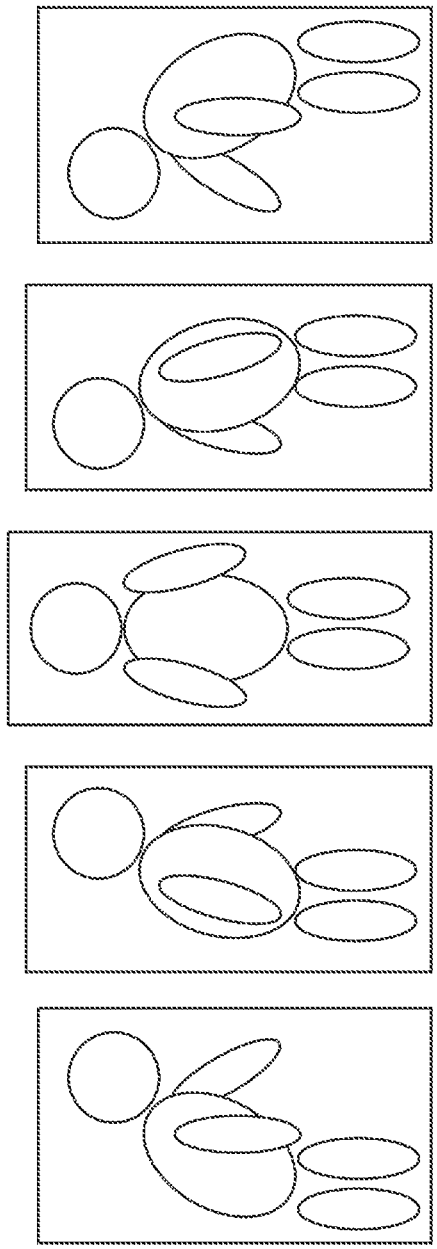

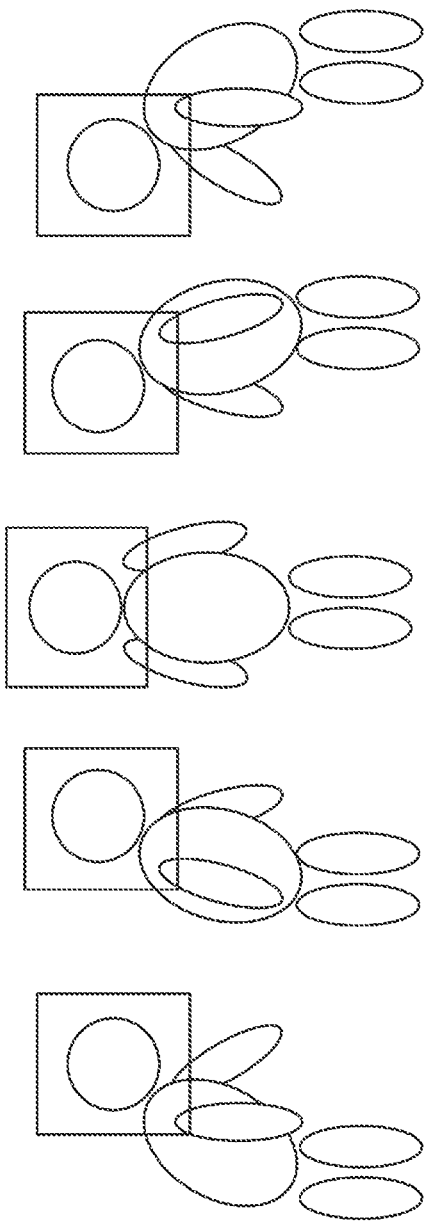

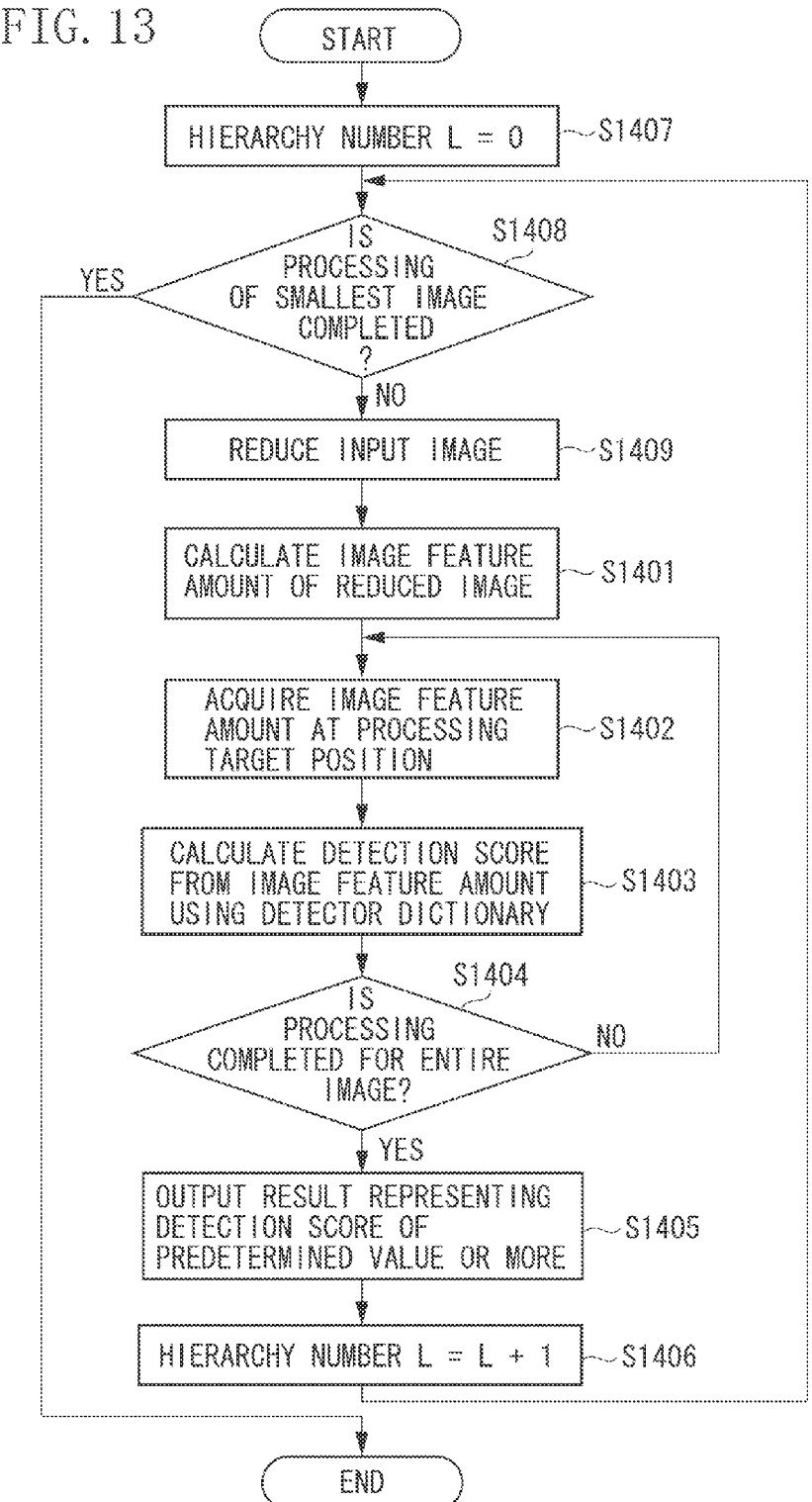

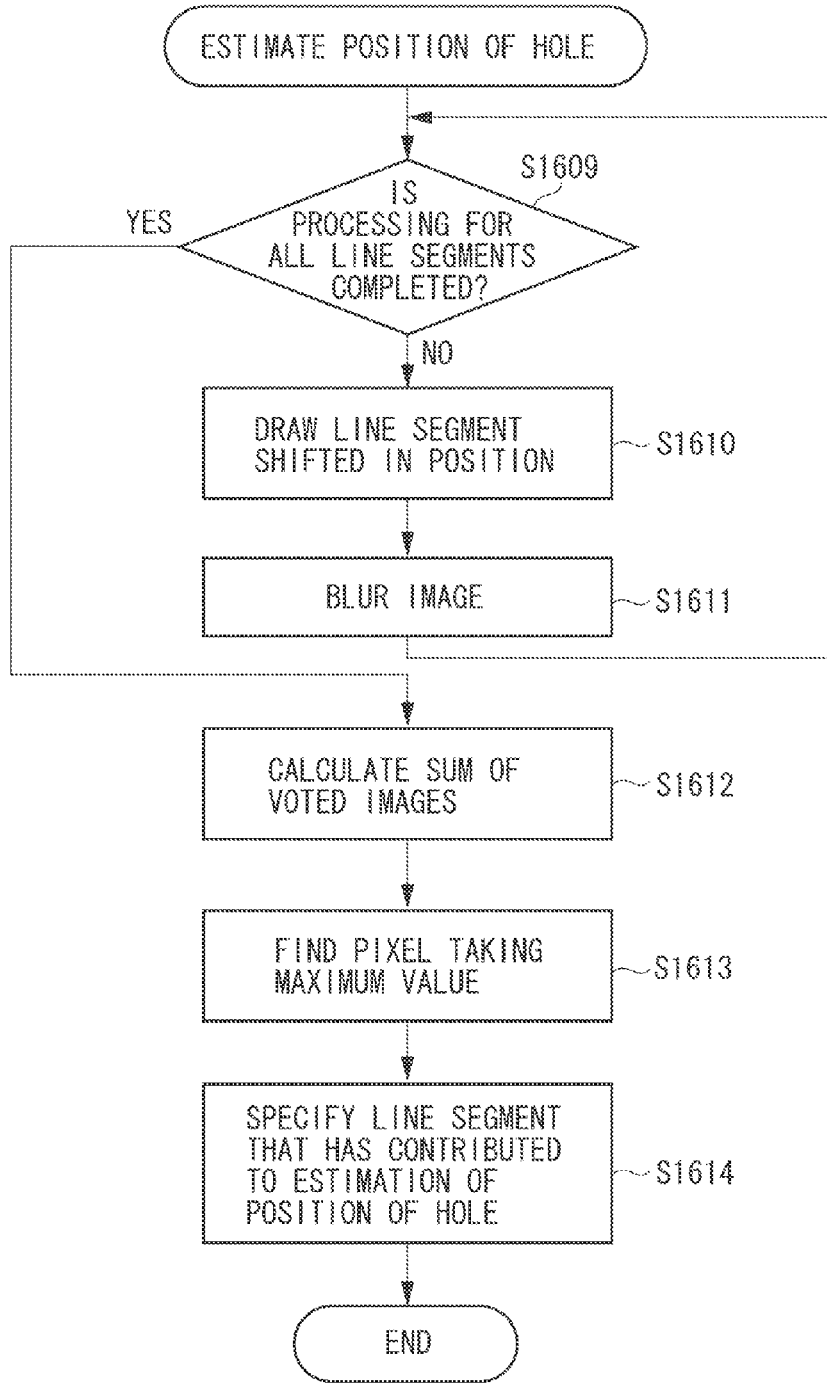

OBJECT DETECTION APPARATUS AND METHOD THEREFOR

BACKGROUND OF THE INVENTION

1. Field of the Invention

The present invention relates to an object detection technique, and more particularly, to a technique for detecting a predetermined object from input information.

2. Description of the Related Art

In an object detection apparatus that detects an object included in input information, the object can desirably be detected even when the posture of the object changes and when the object is partially shielded. To deal with various states of the object such as the change in the posture and the shielding, detecting the object using a plurality of different detectors is effective.

A technique for detecting an object using a plurality of different detectors has conventionally been proposed. In a document entitled "Improved Part-based Human detection Using Depth Information" by Takayoshi Yamashita, Sho Ikemura, Hironobu Fujiyoshi, and Yuji Iwahori, The transactions of the Institute of Electrical Engineers of Japan. D, Vol. 131, No. 4 (2011) (hereinafter referred to as Document 1), a face detector and an upper body detector are combined, to perform human detection according to a change in a direction of a person and partial shielding of the person. An advantage of combining the face detector and the upper body detector will be specifically described below. The face detector can detect a face with a high performance because various methods have been developed. If the face is seen, the person can be detected with a high probability. When the human detection is performed using only the face detector, however, the face becomes difficult to see depending on the direction of the person, so that the person becomes difficult to detect. In the face detector, if the size of the person in the image is decreased, information about a face texture is decreased, so that the person becomes difficult to detect. On the other hand, the upper body detector can detect the upper body of the person in a standing posture regardless of the direction of the person. If a part of the upper body is shielded, however, the detection performance of the upper body detector deteriorates. In Document 1, the face detector and the upper body detector are combined, to compensate their respective disadvantages for each other to detect the person.

If the object is detected using the plurality of different detectors, different detection results need to be merged to output one detection result for one person. At this time, the issue is how the different detection results are merged. Particularly, the issue is a merging method performed when one or more persons exist adjacent to one another and overlap one another. If results of the upper body detector and the face detector are merged, for example, detection results that greatly overlap each other are simply merged and are output as a result of the same person. When a plurality of persons overlap one another, a face detection result 1202 of the person behind may be merged with an upper body detection result 1201 of the person in front, as illustrated in FIG. 1. As a result of this, a result obtained by detecting only the person in front is output in a final result 1203 regardless of the person behind being detected by the face detector.

In Document 1, to solve this issue, a face position is estimated from a detection result of the upper body detector, and is combined with a detection result position of the face detector, to find a cluster center of the detection result by "mean shift". By this processing, results of a plurality of detectors for detecting different sites are merged.

In Document 1, a face position is estimated from the detection result of the upper body detector. However, the face position is estimated from a detection result of the upper body, so that the face position tends to be lower in reliability than the face position represented by the face detection result. Since the estimated face position low in reliability and the face position represented by the face detection result relatively high in reliability are simply merged with each other, the face position to be finally output may be output to an erroneous position. In Document 1, even when the entire upper body is seen regardless of using the upper body detector, a range of the upper body cannot be specified.

SUMMARY OF THE INVENTION

According to an aspect of the present invention, an object detection apparatus includes a first detection unit configured to detect a first portion of an object from an input image, a second detection unit configured to detect a second portion different from the first portion of the object from the input image, a first estimation unit configured to estimate a third portion of the object based on the first portion when the first detection unit detects the first portion, a second estimation unit configured to estimate a third portion of the object based on the second portion when the second detection unit detects the second portion, a determination unit configured to determine whether the third portions, which have been respectively estimated by the first and second estimation units, match each other, and an output unit configured to output, if the determination unit determines that the third portions match each other, a detection result of the object based on at least one of a detection result of the first or second detection unit and an estimation result of the first or second estimation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A to 6D illustrate processing for evaluating a head position estimation result using a correct answer criterion of a head.

FIG. 7 is a flowchart of processing performed by a merging result output unit.

FIG. 9 illustrates an example of a detection target of an entire body detector.

FIG. 10 illustrates an example of a detection target of a head detector.

FIG. 13 is a flowchart of processing performed by a detection processing unit.

FIGS. 16A to 16C are flowcharts of processing performed by an object detection apparatus for inspection.

DESCRIPTION OF THE EMBODIMENTS

Various exemplary embodiments, features, and aspects of the invention will be described in detail below with reference to the drawings.

In a first exemplary embodiment, an object in an image is detected using a plurality of different detectors. The different detectors respectively use different sites and states of the object as detection targets. While the object to be detected in the present exemplary embodiment is not particularly limited, the object to be detected is a person in the first exemplary embodiment.

Figure 1:
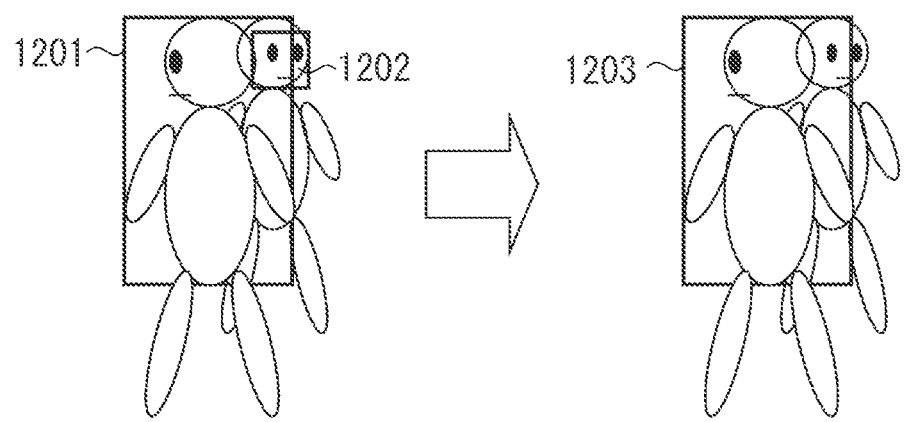
FIG. 1 illustrates an issue in merging different types of detectors.
Figure 2:
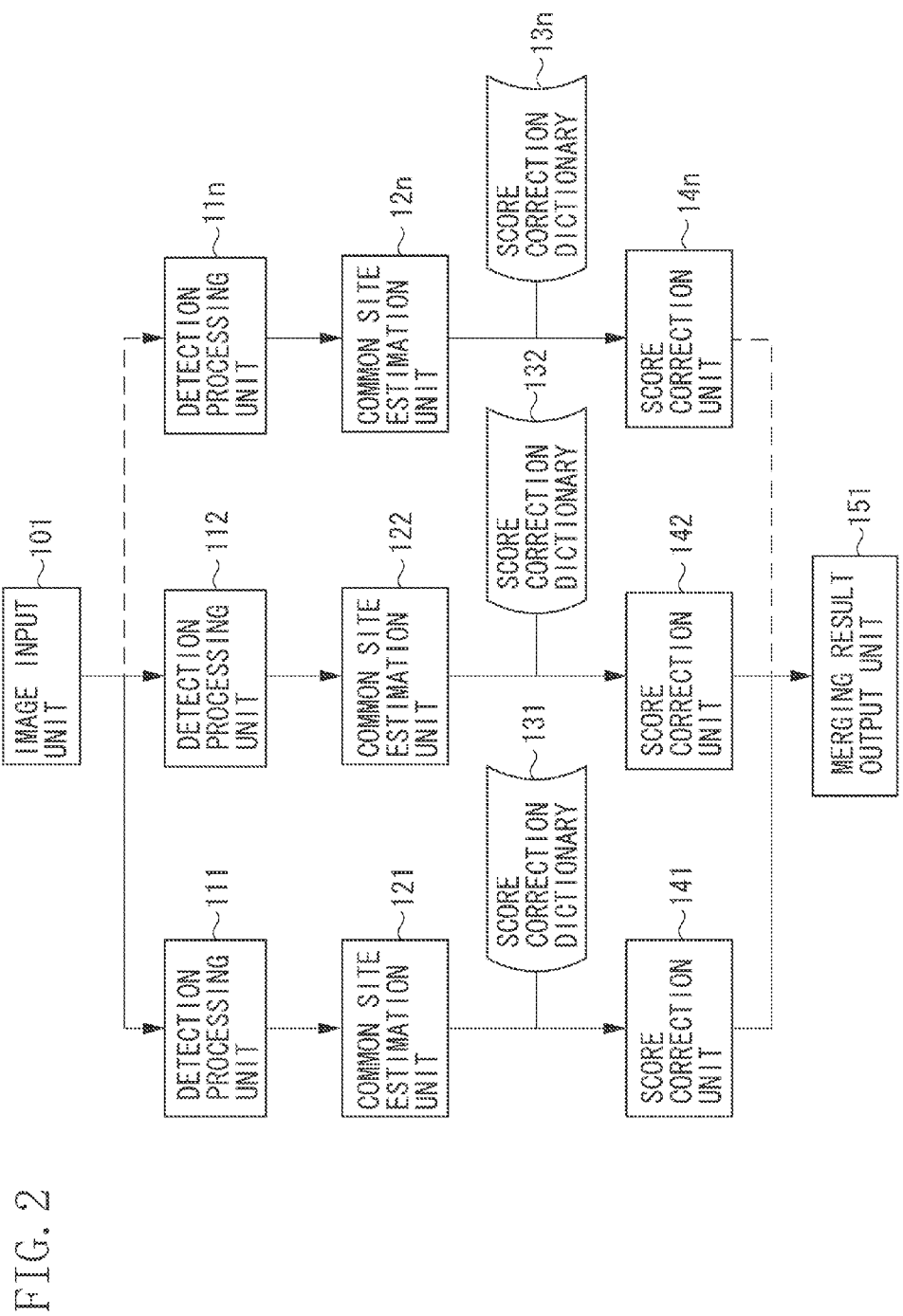
FIG. 2 illustrates a configuration of an object detection apparatus.

FIG. 2 illustrates a configuration of an object detection apparatus according to the present exemplary embodiment. The object detection apparatus according to the present exemplary embodiment can be implemented by executing software (a program) acquired via a network or various types of recording media on a computer (not illustrated) including a central processing unit (CPU), a memory, a storage device, an input/output device, a bus, a display device, and others. The computer may be a general-purpose computer, or may be hardware designed optimally for the software in the present exemplary embodiment.

The object detection apparatus according to the present exemplary embodiment includes an image input unit 101, a plurality of detection processing units 111 to 11n, and common site estimation units 121 to 12n, score correction dictionaries 131 to 13n, and score correction units 141 to 14n respectively corresponding to detection processing units 111 to 11n, and a merging result output unit 151, as illustrated in FIG. 2. The constituent elements will be described below.

The image input unit 101 inputs an image serving as a processing target to the object detection apparatus. The image to be input to the image input unit 101 may be an image corresponding to one frame of a moving image acquired from a camera or the like, or may be an image stored in a storage device such as a hard disk. Processing for one image input to the image input unit 101 will be described below.

The detection processing units 111 to 11n previously stores detectors that respectively detect different sites and states of the object. If the object to be detected is a person, the different detectors in the detection processing units include detectors respectively using different sites of the person as targets, e.g., a face detector, a head detector, an upper body detector, and an entire body detector. The detectors that detect the different sites of the person are used so that the person can be detected even when a part of the person is shielded with another object and if a part of the person is positioned outside the image.

As the plurality of detectors according to the present exemplary embodiment, detectors configured to complement respective detection results with one another are desirably prepared. The mutual complementation of the detectors can include a combination of the head detector and the entire body detector. First, the head detector has the advantages of being able to detect the person even if the sites below the body are shielded with another object and being able to detect the person without being affected by a posture variation of a body part. On the other hand, the entire body detector has the disadvantage of being weak in shielding and a posture variation, although it has the advantage of easily grasping characteristics of the person because the site serving as a target is large. The head detector and the entire body detector are simultaneously used so that the respective disadvantages can be compensated for each other. Therefore, the detection accuracy of the person can be expected to be improved.

Each of the detectors can be prepared in the following manner. In the face detector, Haar-Like feature amounts in a face range of a learning image are collected, and face-like features are made statistically discriminable using an adaptive boosting (AdaBoost) to learn a face detector, as discussed in a document entitled "Rapid Object Detection using a Boosted Cascade of Simple Features" by P. Viola and M. Jones, IEEE Conference on Computer Vision and Pattern Recognition (2001). If the other sites of the person, i.e., the head, the upper body, and the entire body are learned, a histograms of oriented gradient (HOG) feature amount (see a document entitled "Histograms of oriented gradients for human detection." by Dalal, N., & Triggs, B, IEEE CVPR (2005)) can be used as an image feature. If the head detector, the upper body detector, and the entire body detector are prepared, a learning image of each of the sites is prepared, and its HOG feature amount is acquired, to learn the detector of the site using a discriminator such as a support vector machine (SVM) or an AdaBoost. A learning result (e.g., a weak discriminator such as an AdaBoost) is stored as a detector dictionary, and is used during detection.

Each of the detectors calculates the likelihood of a detection result of the person as a detector score. In the AdaBoost, for example, a weighted sum of outputs of weak discriminators is output as a detector score. In the SVM, a distance from an identification hyperplane is calculated as a detector score. Even in determination processing other than the foregoing processing, any method may be used to output a score representing an object-like feature. The higher the detector score is, the higher an output representing a feature like a site or a state of the person used as a target by each of the detectors is.

In the first exemplary embodiment, a case where the entire body detector, the head detector, and the face detector are respectively used as a first detection unit for detecting the entire body as a first portion, a second detection unit for detecting the head as a second portion, and a third detection unit for detecting the face as a third portion as a plurality of detectors will be described below. However, a configuration of the detector used in the present exemplary embodiment is not limited to this.

Figure 3:
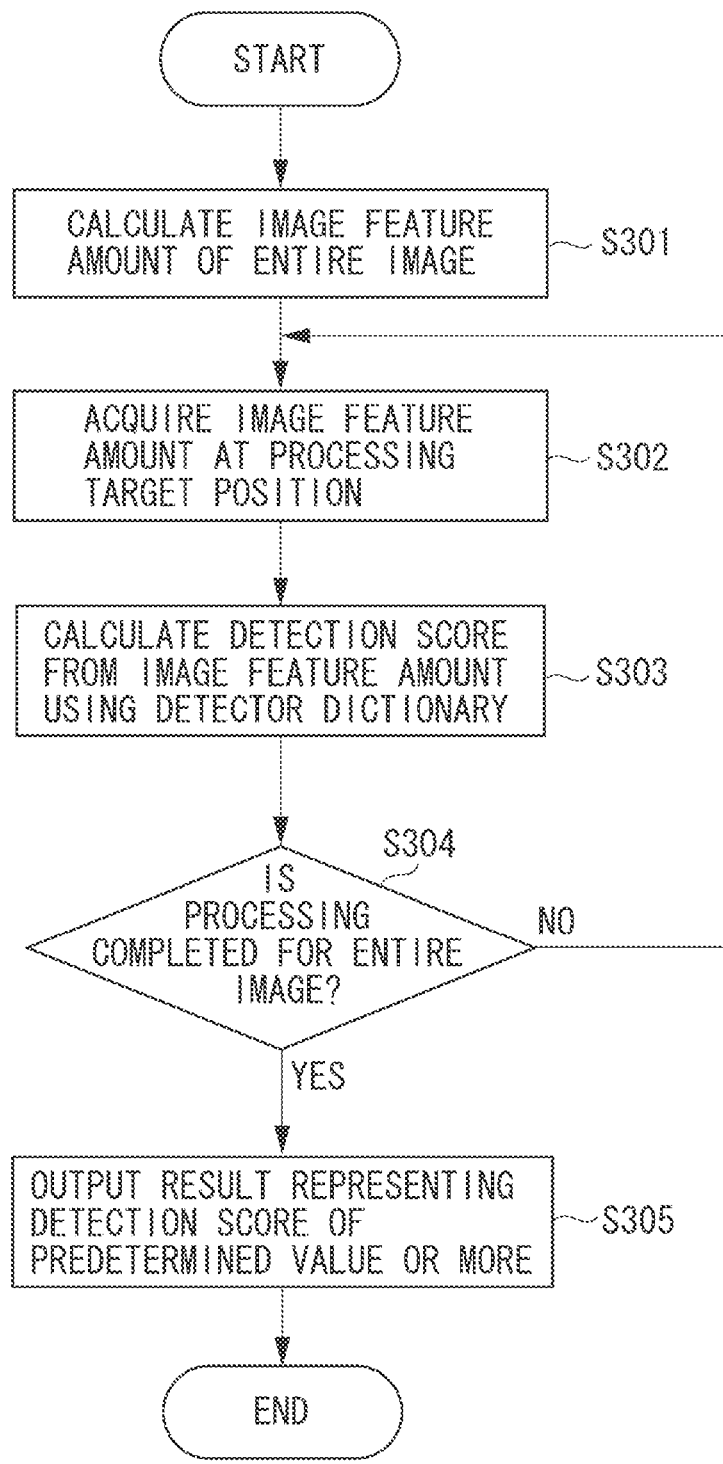
FIG. 3 is a flowchart of processing performed by a detection processing unit.

Processing in the plurality of detection processing units 111 to 11n will be described below. FIG. 3 is a flowchart of processing in one of the detection processing units (e.g., the detection processing unit 111). For illustrative purposes, the detection processing unit 111 performs detection processing using the entire body detector. In step S301, the detection processing unit 111 calculates an image feature amount of an input image. The detector in the detection processing unit 111 is the entire body detector. Therefore, the detection processing unit 111 calculates an HOG feature amount from the input image. In step S302, the detection processing unit 111 then acquires an image feature amount at a specific position where detection processing is performed. In step S303, the detection processing unit 111 calculates a detection score corresponding to a likelihood representing an object-like feature from the image feature amount of the input image serving as a processing target using a detector dictionary. In step S304, the detection processing unit 111 determines whether the process in step S303 for calculating the detection score at each position in the image has been performed for the entire image while changing a determination position to search the entire image. If the process in step S303 has been performed for the entire image (YES in step S304), the processing proceeds to step S305. If the process in step S303 has not yet been performed (NO in step S304), the processing returns to step S302. In a loop for changing the determination position, an image size serving as a determination target is also changed so that a person appearing in different sizes in the image can also be detected. By the processes from step S302 to step S304, the detection score at each position in the image is obtained. While all results may be sent to the subsequent common site estimation unit, an entire processing load can be reduced by omitting the subsequent processes for a detection result having a low detection score, which cannot be determined to be clearly a person. Therefore, in step S305, the detection processing unit 111 performs threshold value processing for leaving only a detection result having a detection score of a predetermined value or more, to delete a useless detection result. As a result of the process in step S305, positional information about a position having a high detection score in the image and the detection score are output from the detection processing unit 111.

While the processing result of the one detection processing unit has been described above, the processing performed by the one detection processing unit is repeated by n times corresponding to the number of detection processing units as the entire object detection apparatus.

The common site estimation units 121 to 12n will be described below. In the common site estimation units 121 to 12n, a position of a common site of an object is estimated from a result of each of the detectors. In the first exemplary embodiment, a procedure, using the head of the person as a common site, for estimating, from detection results of a first detection unit, a second detection unit, and a third detection, a position of the head serving as the common site by a first estimation unit, a second estimation unit, and a third estimation unit respectively corresponding thereto. The common site to be estimated is not particularly limited if it can be commonly estimated by the detectors. However, a site characteristic of the object (a site that is easily detected) and a site that is not easily affected by shielding from a surrounding object and a change in the posture of the object are desirably selected. If the object to be detected is a person, the head of the person is suitable as a common site because the head is not relatively easily shielded and the position thereof is easily specified.

Figure 4:
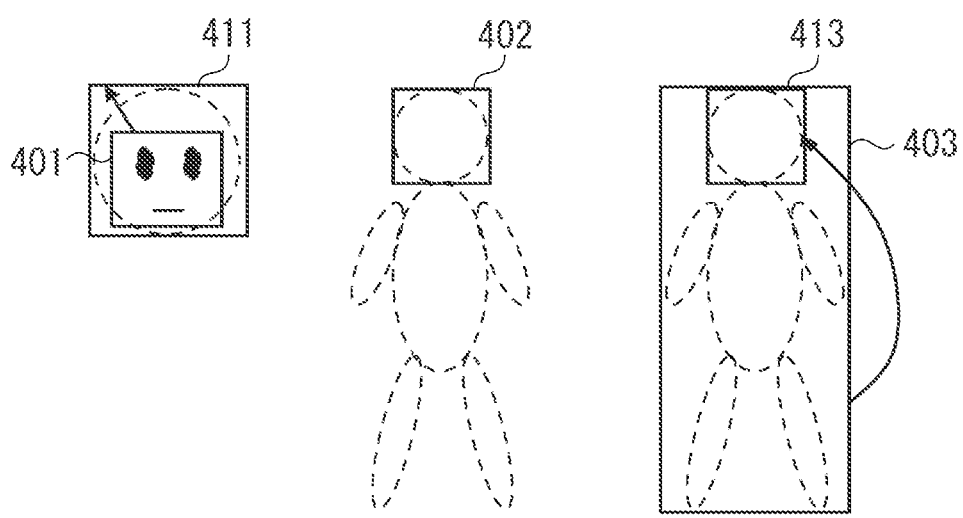
FIG. 4 illustrates processing for estimating a head position from a detection result position.

FIG. 4 illustrates estimation of the position of the head from a result of each of the detectors. As a result of detection processing, information about a position/range of a detection target is obtained. In the present exemplary embodiment, the position/range of the detection result is obtained in a rectangular frame enclosing the detection target. In FIG. 4, the detection result is represented by rectangular frames. The rectangular frames include a face detection result frame 401, a head detection result frame 402, and an entire body result frame 403. The rectangular frame is expressed by the following equation (1) in image coordinates of each of two points:

$$X = (x_1, y_1, x_2, y_2)^T \quad (1)$$

Figure 5:
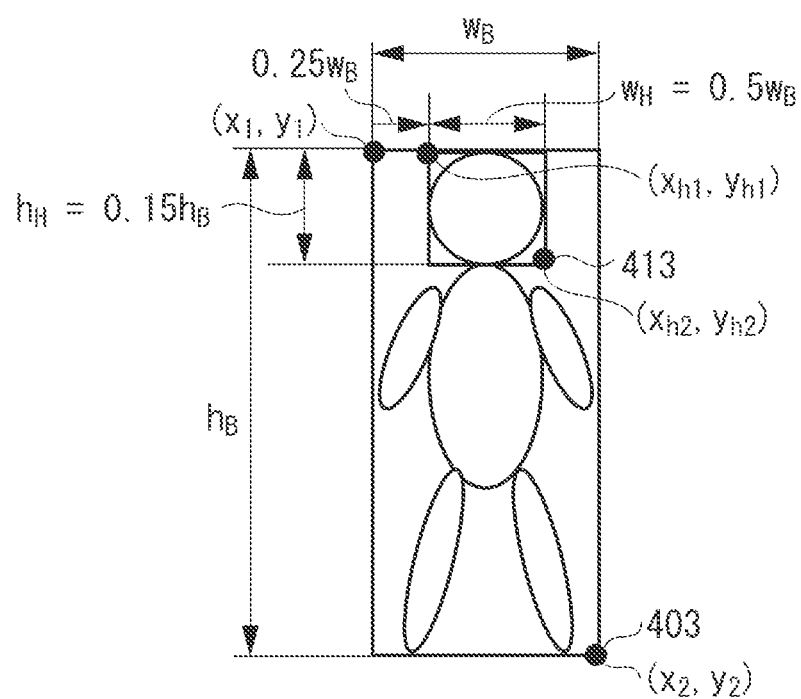
FIG. 5 illustrates a definition of a relationship between a detection result position and a head position in an entire body detector.

Here, $x_1$ and $y_1$ are image coordinates of an upper left point of a rectangle, and $x_2$ and $y_2$ are image coordinates of a lower right point of the rectangle. In the common site estimation unit, the position/range of the head is estimated from the rectangular frame. For example, in FIG. 4, a position/range of the head estimated from the face detection result frame 401 is represented by a rectangular frame 411, and a position/range of the head estimated from the entire body result frame 403 is represented by a rectangular frame 413. The estimation of the head from the detection result frame is performed by previously defining a positional relationship between the detection result frame and the head and converting the detection result frame to the position of the head. For example, FIG. 5 illustrates an example of definition of a positional relationship between a result of the entire body detector and a head position. In the definition of the head position relative to the entire body detector illustrated in FIG. 5, 15% of a height $h_B$ of the entire body detector is a head height $h_H$, and 50% of a width $w_B$ of the entire body detector is a head width $w_H$. An offset of 0.25 $w_B$ is defined in an x-axis direction. The offset represents a position in the entire body result frame 403 in an x-direction of the head position range rectangular frame 413 ($X_h$–$X_1$ using $X_h$ in the following equation (2)). The head position estimated from the entire body detector is found as head estimation coordinates $X_h$ according to the definition illustrated in FIG. 5 from coordinates X of the entire body detection result 403. The head estimation coordinates $X_h$ are expressed by the following equation (2):

$$X_h = (x_{h1}, y_{h1}, x_{h2}, y_{h2})^T \quad (2)$$

Here, $x_{h1}$ and $y_{h1}$ are coordinates of an upper left point of an estimated head range, and $x_{h2}$ and $y_{h2}$ are coordinates of a lower right point of the estimated head range. The common site estimation unit 121 calculates, for each of detection results obtained as a result of the processing performed by the detection processing unit 111, the head estimation coordinates $X_h$ from the coordinates X of the entire body detection result 403.

In the definition of the head range illustrated in FIG. 5, numerical values may be previously input and designed by a person, or may be designed from an average of head positions obtained from an actual entire body detection result. Alternatively, the numerical values may be obtained in another way and set. If the average of the head positions is acquired, the numerical values can be obtained by performing detection processing using the entire body detector for a plurality of sample images and calculating an average of the head positions in the entire body detection result.

An operation of the common site estimation unit has been described above using a method for estimating the head position from the entire body detector as an example. For estimation of a head position from each of detection results of the other detectors, a positional relationship between the detection result and the head position is defined, and the head position is estimated from the detection result, like in the entire body detector. While the head position inside the detection result is estimated in the entire body detector, the estimated head position is not necessarily inside the detection result. For example, the head position 411 estimated from the face detection result 401 illustrated in FIG. 4 is positioned outside the face detection result 401. For the detection result 402 of the head detector for detecting the head itself, processing may be omitted in the common site estimation unit, to output a head detection result itself as a common site estimation result.

The score correction dictionaries 131 to 13n and the score correction units 141 to 14n will be described below. In the present exemplary embodiment, one or more different detection results are merged using a position of a common site estimated from each of the detection results and a detection score corresponding thereto. The position of the common site is a result estimated from the detection result, and its estimation accuracy differs depending on the detector. While the head position is estimated as the common site in the present exemplary embodiment, the estimation performance of the head position can be better in the detector close to the head position or closely linked to the head. In the score correction dictionaries 131 to 13n and the score correction units 141 to 14n, the detection scores are corrected based on a difference in the estimation performance of the common site among the detectors, to merge detection results considering the difference in the estimation performance of the common site. The accuracy of a detection result of the object can be expected to be improved by merging the detection results using the detection scores after the correction.

In the score correction units 141 to 14n, the detection scores of the detectors are respectively converted using information recorded in the score correction dictionaries 131 to 13n. Information for correcting the detection scores are respectively stored in the score direction dictionaries 131 to 13n based on the reliability of the estimation of the common site among the detectors.

In the score correction, a correction score may be calculated by storing a correction coefficient in the score correction dictionary for each of the detectors and multiplying the detection score by the correction coefficient for the score correction. As an example of the correction coefficient, a correction coefficient of the head detector is 1, a correction coefficient of the face detector is 0.8, and a correction coefficient of the entire body detector is 0.5, for example. A high coefficient is set in the detector close to the head (or the detector having a high estimation performance at the head position), and a low coefficient is set in the detector far from the head (or the detector having a low estimation performance at the head position). The detection score is multiplied by the coefficient to obtain the correction score, so that the correction score considering the detection result of the detector and the performance of the estimation of the common site can be obtained.

While the person has input and set the correction coefficient, the correction coefficient is appropriately set according to a probability that estimation of the head position by each of the detectors is correct. The probability that the estimation of the head position by each of the detectors is correct needs to be previously found. A method for obtaining the probability that the estimation of the head position is correct and the correction coefficient stored in the score correction dictionary will be described below with reference to FIGS. 6A to 6D.

An image sample group a head position of which is known is first prepared. FIG. 6A illustrates an example of an image 600 including a person whose head position is known. In FIG. 6A, coordinates of a head range are recorded as a head correct answer 601. Only one person desirably appears in the image 600. Alternatively, the image 600 is desirably cut out in a range of one person. Thus, a large number of images respective head positions of which are known are thus prepared. FIG. 6B illustrates a result of subjecting the image 600 illustrated in FIG. 6A to a face detection. As a result of the face detection, detection processing is sequentially performed for the entire image 600 by the face detector, similarly to the detection processing described in FIG. 3. A detection result 611 having the highest face detection score in the image 600 is focused on. Only one person appears in the image 600. Therefore, the detection result 611 having the highest detection score can be a face. A result 612 a head position of which has been estimated is then calculated from the face detection result. The head position estimation result 612 and the head correction answer 601 are compared with each other, to evaluate whether the head position has been correctly estimated by calculating a degree of matching therebetween. In the evaluation of the head correct answer 601 and the head position estimation result 612, if a center distance at each position is within a predetermined range, for example, an estimation result is correct. As another reference, a ratio of overlapping of the head correct answer 601 in a rectangular shape and the head position estimation result 612 may be calculated, to determine a result having a predetermined ratio of overlapping or more to be correct in the head estimation. The center distance and the ratio of overlapping are examples of an index representing a degree of matching between the head position estimation result 612 and the head correct answer 601. A ratio of overlapping a between rectangles can be calculated by the following equation (3), for example:

$$\alpha = \frac{S_{be}}{S_b + S_e - S_{be}} = \frac{\text{area of overlapping region}}{\text{area of entire region}} \quad (3)$$

Here, $S_b$ is the area of the head correct answer 601, $S_e$ is the area of an estimated head range, and $S_{be}$ is the area of a region where the head correct answer 601 and the estimated head range overlap each other. The foregoing correct answer determination is performed for all image sample groups that have been prepared, to obtain the probability that the head estimation becomes correct. If the detection result itself is not obtained for the image samples, it is determined that the head estimation is incorrect.

Similarly for the other detectors, a probability that head estimation is correct may be obtained for each of the detectors and used as a correction coefficient of the detector. In FIG. 6D, a positional relationship between a head position 632 estimated from a detection result 631 of the entire body detector and the head correct answer 601 is evaluated, for example. In FIG. 6D, the estimated head position 632 is greatly shifted from the head correct answer 601. Therefore, a center distance becomes great and a ratio of overlapping becomes low, so that head estimation by the entire body detector becomes incorrect. FIG. 6C illustrates a determination whether a detection result of the head detector is correct. The detection result of the head detector may be evaluated as a head correct answer, similarly to other results, and a performance representing a head position may be evaluated to calculate a correction coefficient. In the head detector, the head position need not necessarily be estimated. Therefore, a position of the detection result itself and the head correct answer 601 are evaluated in this case.

In the calculation of the correction coefficient using the above-mentioned ratio of overlapping u, a correct answer probability is calculated by binary determination of a correct answer/incorrect answer using each of image samples. Platt scaling (see a document entitled "Probabilistic Outputs for Support Vector Machines and Comparisons to Regularized Likelihood Methods." by Platt, J. C., Advances in Large Margin Classifiers. (1999)) and Isotonic Regression (see a document entitled "Transforming classifier scores into accurate multiclass probability estimates." by Zadrozny, B., & Elkan, C., Proceedings of the Eighth ACM SIGKDD International Conference on Knowledge Discovery and Data Mining. (2002)) may be performed using this information, to correct a score.

In the foregoing processing, a result of each of the detectors includes an estimated head position and a corrected score. In the merging result output unit 151, results of the detectors are merged, to collect information output from the plurality of detectors for the same person. The present exemplary embodiment does not aim at collecting detection results output in an overlapped manner from the same detector in the periphery of the same person, and differs from Document 1 in this respect. To collect the detection results output in an overlapped manner from the same detector, mean shift and non-maximum suppression (NMS) may be performed, like in Document 1, after the merging result output unit 151.

In the present exemplary embodiment, a person that can be detected by both the head detector and the entire body detector is output as a detection result. This apparently seems to significantly increase an undetection ratio. However, this is actually based on the observation that both the detectors may output the detection result while having low scores even if the person is shielded. This is effective regardless of whether the NMS or the like is applied to the output of each of the detectors.

Processing for merging information output from the plurality of detectors for the same person will be described below. FIG. 7 is a flowchart illustrating processing performed by the merging result output unit 151. Processing from step S801 to step S804 is first performed while looping for each of output results of the entire body detector. A number of the output result of the entire body detector, which is focused on, is i (i=1, ..., L). The output result (a detection position and a size) is $X_{hB, i}$, and its head estimation coordinate is $X_{hB, i}$. In step S802, the merging result output unit 151 then selects, out of head detection estimation results, the head detection estimation result having the highest ratio of overlapping with the head estimation coordinate $X_{hB, i}$. A number of the head detection estimation result is j (j=1, ..., M), and its head estimation coordinate is $X_{hH, j}$. A ratio of overlapping ratio $A_0$ ($X_{hB, i}$, $X_{hH, j}$) between the head estimation coordinate $X_{hB, i}$ and the head estimation coordinate $X_{hH, j}$ is obtained by the following equation (4):

$$A_0(X, Y) = \frac{P(X, Y)}{S(X) + S(Y) - P(X, Y)} = \frac{\text{area of overlapping region}}{\text{area of entire region}} \quad (4)$$

Here, P(X, Y) is the area of a region where a rectangle X and a rectangle Y overlap each other. S(X) is the area of the rectangle X. In step S803, the merging result output unit 151 then selects, out of face detection estimation results, the face detection estimation result having the highest ratio of overlapping with $X_{hB, i}$. A number of the face detection estimation result is k (k=1, ..., N). In step S804 at the end of the loop, the merging result output unit 151 outputs a vector expressed by the following equation (5) for a detection result i of each of the entire body detectors:

$$R_i = (X_{hH, j}, X_{B, i}, S_{B, i} + S_{H, j} + S_{F, k}) \quad (5)$$

Here, $S_{B, i}$, $S_{H, j}$, and $S_{F, k}$ are respectively a correction score of an output of the i-th entire body detector, a correction score of an output of the j-th head detector, and a correction score of an output of the k-th face detector. The sum of the correction scores is output as a merging score from the merging result output unit 151. In the present exemplary embodiment, the respective scores of the detectors are corrected to calculate the simple sum of the scores as a merging score. The scores may not be required to be corrected depending on the type of each of the detectors. Whether the scores are corrected or are not corrected, the linear sum of the scores of the detectors can also be calculated as a merging score. A linear coefficient in this case can be obtained by learning of an SVM using the score of each of the detectors as an input vector.

Figure 8A:
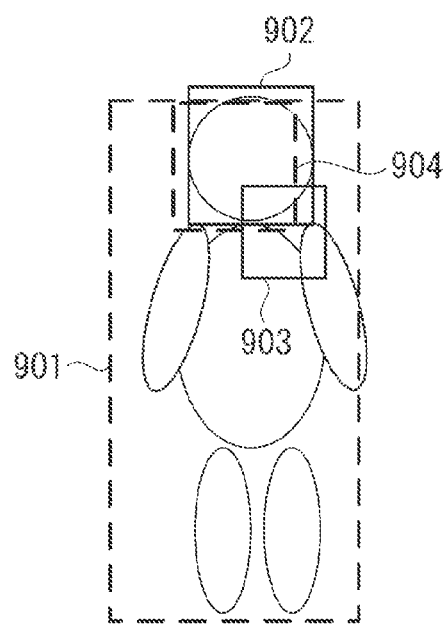
FIGS. 8A and 8B illustrate a specific example of processing performed by a merging result output unit.
Figure 8B:
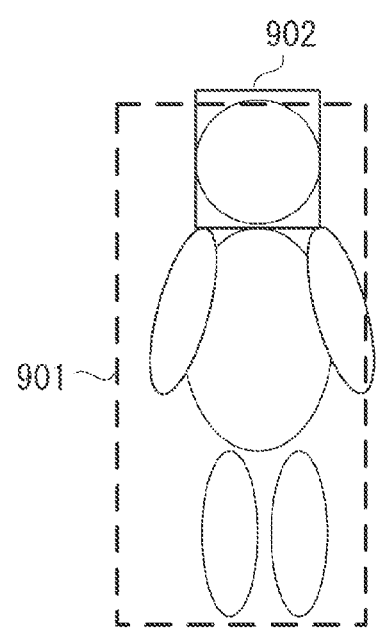

FIGS. 8A and 8B illustrate a specific example of processing performed by the merging result output unit 151. FIG. 8A illustrates a state where a plurality of detection results is obtained at the time point where the detection results are input to the merging result output unit 151. For convenience of illustration, a result of the face detector is omitted, and only a detection result of the head detector and a detection result of the entire body detector are illustrated. FIG. 8A illustrates the detection result of the one entire body detector and its head estimation result. A rectangle 901 indicated by a broken line is a result of the entire body detector, and a rectangle 904 indicated by a broken line is a head position estimated from the entire body detector. Two head detection results 902 and 903 of the head detector are respectively indicated by solid lines. As a result of performing detection processing while changing a search position in an image by the detection processing unit, a plurality of detection results is obtained around the head of the person. In the merging result output unit 151, the detection results are collected using the method described with reference to FIG. 7 from the detection results using estimation information about a position of the head serving as the common site. FIG. 8B illustrates a result of processing the detection result illustrated in FIG. 8A by the merging result output unit 151, and indicates that the estimated head position 904 based on the entire body detector and the head detection result 902 having the highest ratio of overlapping are selected and are left as a merging result. On the other hand, the head detection result 903 that can be erroneously detected by the head detector is deleted because there is no corresponding entire body detection result.

As described above, in the present exemplary embodiment, the existence of the object to be detected can be obtained with a higher accuracy than that in the conventional technique. Verification is repeated based on the plurality of detectors, so that a common site estimation position represented by a merging result of a final output may be less erroneously detected than that in the conventional technique. The head position detected by the head detector having a high positional accuracy is used for the final output. Therefore, a detection result having a high positional accuracy can be obtained. The result of the entire body detector is also output. Therefore, when the entire body appears in the input image, a position and a size of the entire body can be found.

While the detection result of the head detector and the detection result of the entire body detector are output as final outputs in the above-mentioned exemplary embodiment, either one of the detection results may be a final output. The site estimated by either one of the common site estimation units 121 to 12n may be output as a final output instead of the detection result of the detector.

A case where one or more detectors of the same type are combined will be described below as a second exemplary embodiment. This can deal with a great posture variation. Even in the second exemplary embodiment, an object to be detected is a person, and a common site is the head of the person. Description of the same processing as the content described in the first exemplary embodiment is not repeated.

While the entire configuration of an object detection apparatus according to the second exemplary embodiment is the same as that illustrated in FIG. 2 according to the first exemplary embodiment, detection targets of detection processing units 111 to 11n differ from those in the first exemplary embodiment. A processing content of a merging result output unit 151 differs from that in the first exemplary embodiment.

In the present exemplary embodiment, a head detector and an entire body detector are used as detectors.

There is a plurality of postures, as illustrated in FIG. 9, as a specific detection target by the entire body detector. While five postures are arranged, the number of postures can be increased or decreased depending on a specification to be required. A position of an arm does not particularly matter, although illustrated for easy understanding. If another posture needs to be detected, a detector for detecting the posture may be prepared. To prepare these detectors, images classified into image groups according to postures may be prepared, to learn a detector using an HOG feature amount, described above, for each of the groups of images. Note that respective positions of heads within detection frames (rectangles indicated by solid lines) differ from one another. If only one detector implements entire body detection, like in the first exemplary embodiment, the estimation accuracy of the position of the head is reduced.

FIG. 10 illustrates a specific detection target of the head detector. Head portions corresponding to a plurality of postures are illustrated in FIG. 10. A detection frame is indicated by a solid rectangle. While a head detector is prepared for the same posture as that for which the entire body detector is prepared, the postures may neither be the same nor be the same in number. Head images are classified into image groups according to postures, to learn a detector using an HOG feature amount for each of the image groups, like in the entire body detector. Since a detection frame is made wider than the actual head in this example, a head position needs to be estimated from an output of the head detector, like when estimated by the entire body detector in the first exemplary embodiment.

Figure 11:
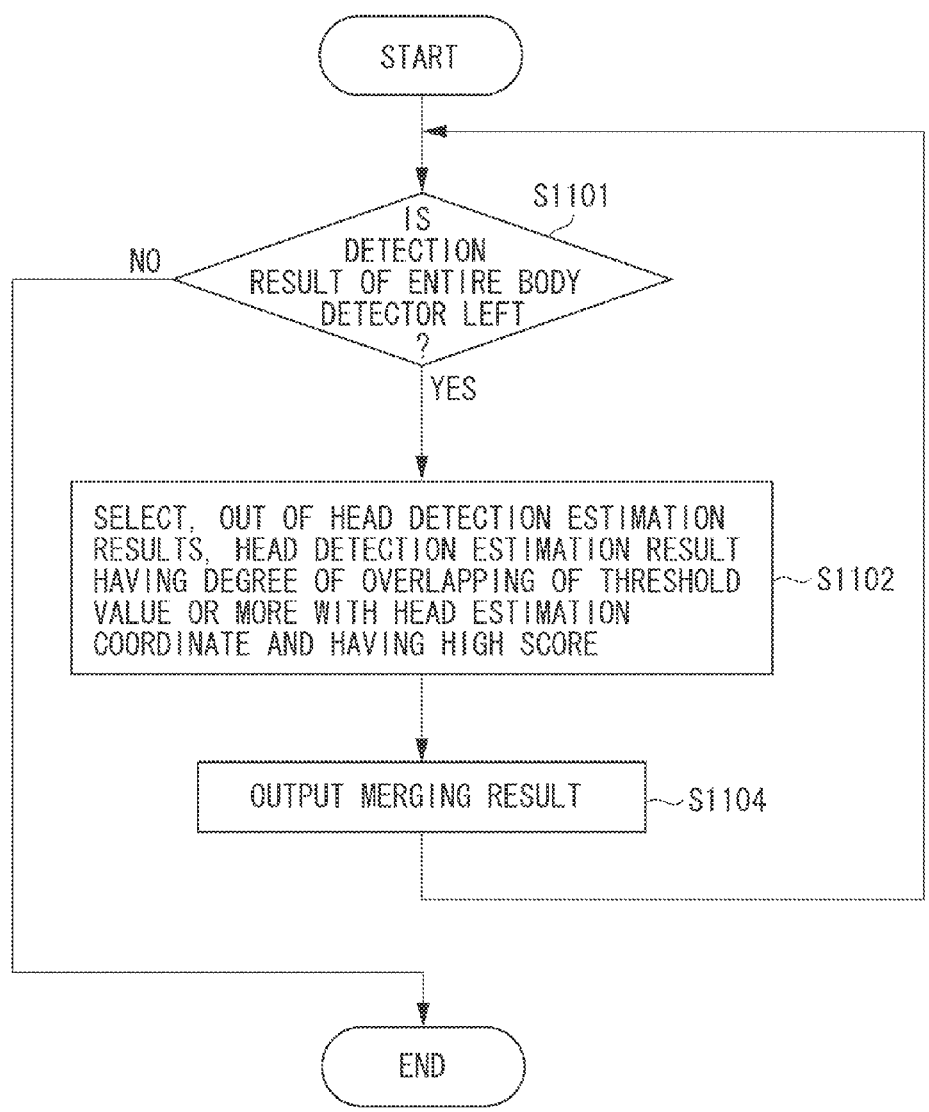
FIG. 11 is a flowchart of processing performed by a merging result output unit corresponding to multiple postures.

At last, FIG. 11 illustrates a processing content of a merging result output unit 151. While the processing content hardly differs from that illustrated in FIG. 7, all outputs of a plurality of entire body detectors are assigned serial numbers, and outputs of a plurality of head detectors are assigned serial numbers. Then, the merging result output unit 151 first performs processes from step S1101 to step S1104 for each of output results of the entire body detector, like in FIG. 7. A number of an output result of the entire body detector, which is focused on, is i (i=1, . . . , $\Sigma_d L_d$; $L_d$ is an output number of the d-th entire body detector). A head estimation coordinates of the output result is $X_{hB,\,i}$. In step S802, the merging result output unit 151 then selects, out of head detection estimation results, the head detection estimation result having a degree of matching of a predetermined threshold value or more and having the highest score. A number of the head detection estimation result is j (j=1, . . . , $\Sigma_d M_d$; $M_d$ is an output number of the d-th head detector), and its head estimation coordinate is $X_{hH,\,j}$. A degree of matching A1 ($X_{hB,\,i}$, $X_{hH,\,j}$) between the head estimation coordinates $X_{hB,\,i}$ and $X_{hH,\,j}$ is obtained by the following equation (6):

$$A_1(X, Y) = \frac{D(X, Y)}{\sqrt{\max\{S(X), S(Y)\}}} \quad (6)$$

Here, D(X, Y) is a center distance between centers of a rectangle X and a rectangle Y. S(X) is the area of the rectangle X. In step S1104 at the end of a loop, the merging result output unit 151 outputs a vector expressed by the following equation (7) for a detection result i of each of the entire body detectors:

$$R_i = (X_{hH,j}, S_{B,i} + S_{H,j}) \quad (7)$$

Here, $S_{B,\,i}$ is a correction score of an output of the i-th entire body detector, and $S_{H,\,j}$ is a correction score of an output of the j-th head detector. The sum of the correction scores is output as a merging score from the merging result output unit 151. The correction score is calculated for each of the detectors, so that the score can be corrected for each posture. Thus, out of all outputs of a plurality of head detectors, the optimum output is combined with the output of the i-th entire body detector. The merging score may be obtained by the linear sum, like in the first exemplary embodiment.

An object detection apparatus being to handle a great posture variation can be implemented by the processing performed by the merging result output unit 151, described above.

As a third exemplary embodiment, an exemplary embodiment using a detection processing unit that divides an object into a plurality of movable parts to detect the parts will be described below. Even in the third exemplary embodiment, an object to be detected is a person, and a common site is the head of the person. Description of the same processing as the content described in the first exemplary embodiment is not repeated.

To perform detection for handling a small posture change of the object, a part-based detection method is known. The part-based detection method includes a method discussed in a document entitled "A Discriminatively Trained, Multiscale, Deformable Part Model" by P. Felzenszwalb, D. McAllester, and D. Ramanan, IEEE Conference on Computer Vision and Pattern Recognition (2008).

Figure 12A:
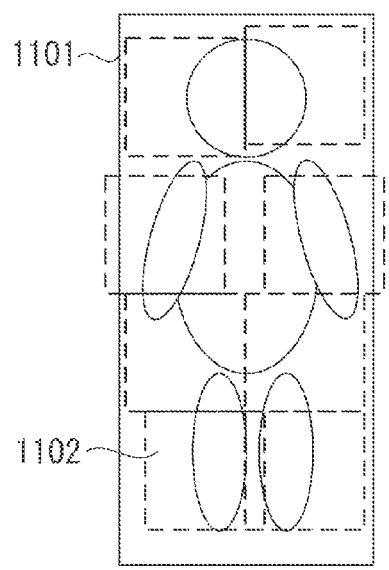
FIGS. 12A and 12B illustrate a part-based detector.
Figure 12B:
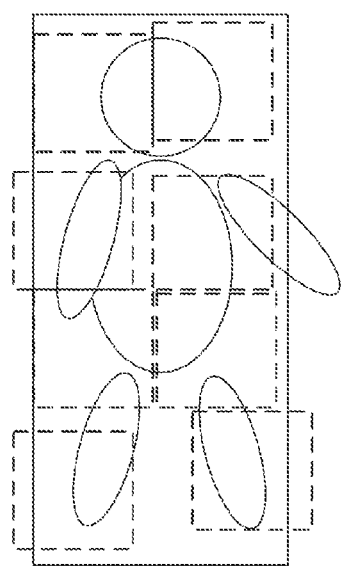

FIGS. 12A and 12B illustrate an entire body detector using the part-based detection method. A dotted line 1102 illustrated in FIG. 12 indicates one part of the entire body detector. The entire body detector illustrated in FIGS. 12A and 12B includes eight parts. A solid line 1101 indicates an entire body detection result obtained as a result of part-based detection. In FIGS. 12A and 12B, respective postures of a person differ. Therefore, respective positions of each of parts obtained as a result of the detection also differ in FIGS. 12A and 12B. In a part-based detection result, a detection score of each of the parts and a detection score as a whole calculated based on a positional relationship are obtained while information about positions/ranges of an object and each of the parts indicated by solid lines and broken lines in FIGS. 12A and 12B are obtained.

An exemplary embodiment in which head position estimation (common site estimation) is performed from a detection result will be described for a case where such a part-based detector is used in a detection processing unit.

Processing for a common site estimation unit to estimate a head position from the detection result of the part-based detector will be described below. If a head part using a head as a detection target is included as a simple case, a position of the head part may be a head position estimation result. If the head part does not match a head range to be estimated (e.g., there is a part using sites from a head to a shoulder as detection targets), the head position may be estimated from the head part serving as a detection result, as described in the first exemplary embodiment.

On the other hand, if a group of parts which does not clearly represented a head constitutes a detector, as illustrated in FIGS. 12A and 12B, a head position can be estimated using information about positions of a plurality of parts. If the head position is estimated from the information about the positions of the plurality of parts, the head position to be estimated is obtained by linear transformation from a vector having respective coordinate information about the parts arranged therein. An example of a linear transformation equation for estimating an x-coordinate $x_{h1}$ at the upper left of the head position from the eight parts is expressed by the following equation (8):

$$x_{h1} = X_p^T B_{h1} = \left(1, \frac{x_{p1}}{w}, \frac{y_{p1}}{h}, \frac{x_{p2}}{w}, \frac{y_{p2}}{h}, \frac{x_{pn}}{w}, \frac{y_{pn}}{h}\right) \quad (8)$$
$$(b_0, b_1, b_2, b_3, b_4 \ldots b_{2n-1}, b_{2n})^T$$

Here, $X_p$ is a coordinate vector of a part plus a constant 1, $B_{h1}$ is a transform coefficient vector, $x_{pn}$ and $y_{pn}$ are center coordinates of the n-th part, and b is a transform coefficient of each of terms for obtaining the coordinate $x_{h1}$. The transform coefficient includes a constant term b0. w and h are respectively the width and the height of an object region (a rectangle 1101 illustrated in FIG. 12A). $y_{h1}$, $x_{h2}$, and $y_{h2}$ may be similarly obtained to obtain a head estimation position $X_h$, respectively, using different transform coefficients. While the head position is estimated from only the center coordinates of each of the parts, coordinate information about the object region 1101 obtained as a result of detection may be added to the coordinate vector of the part. A coefficient vector B can be found by a least-squares method from an image sample group giving a correct answer criterion of a head and a detection result of the part-based detector for the image sample group. A method for estimating the head position is not limited to the least-squares method. The coefficient vector B can also be obtained by another regression analysis using a head position as an objective variable and using a plurality of part positions as an explanatory variable.

The subsequent merging processing for merging head position estimation frames estimated from the entire body detector is the same as that performed by the merging result processing unit 151 in the first exemplary embodiment and the second exemplary embodiment. Particularly in the merging method according to the second exemplary embodiment, the head estimation is performed for each posture, resulting in a higher accuracy.

By the foregoing processing of the common site estimation unit, the head position can be estimated from the detection result of the part-based detector. Thus, the accuracy of the common site estimation can be improved. The common site estimation can handle more postures when combined with the method that can handle multiple postures described in the second exemplary embodiment, so that the accuracy of the common site estimation can be further improved.

The posture of the upper body can also be estimated using the detection result of the entire body detector. The foregoing equation (8) is replaced with the following equation (9), to estimate the upper body posture. The upper body posture means respective coordinates of the throat and the waist, for example:

$$x_{p1} = X_p^T B'_{p1} = \left(1, \frac{x_{p1}}{w}, \frac{y_{p1}}{h}, \frac{x_{p2}}{w}, \frac{y_{p2}}{h}, \frac{x_{pn}}{w}, \frac{y_{pn}}{h}\right) \quad (9)$$
$$(b'_0, b'_1, b'_2, b'_3, b'_4 \ldots b'_{2n-1}, b'_{2n})^T$$

In the foregoing equation (9), xp1 is an x-coordinate of the throat. B'p1 is a transform coefficient vector, and b' is a transform coefficient of each of terms for obtaining xp1. The transform coefficient b' includes a constant term b'0. $y_{h1}$ (a y-coordinate of the throat), xp2 (an x-coordinate of the waist), and yp2 (a y-coordinate of the waist) may be similarly obtained using different transform coefficients to obtain an upper body estimation position $X_p$. A coefficient vector B' can be obtained by a least-squares method from an image sample group giving a correct answer of the upper body posture and a detection result of the part-based detector for the image sample group.

A fourth exemplary embodiment will be described below. While the fourth exemplary embodiment also relates to an object detection apparatus with a combination of a plurality of detectors having different features, detectors having different features can be prepared even if their detection targets are the same. The fourth exemplary embodiment illustrates a method for combining a plurality of head detectors that differ in their optimum head sizes.

Processing for detecting a plurality of sizes using a pyramid image will be described below. While the entire configuration is the same as that illustrated in FIG. 2 in the first exemplary embodiment, processing contents of detection processing units 111 to 11n are replaced with those illustrated in FIG. 13. In step S1407, the detection processing unit first initializes a variable L to zero. A name of the variable is hereinafter referred to as a "hierarchy number". A loop from step S1408 to step S1406 is then repeated by a predetermined number of times. In Step S1408, the detection processing unit determines whether the loop has been repeated by the predetermined number of times. In step S1409, the detection processing unit reduces an input image to $r_L$ times (0<r<1). In step s1401, the detection processing unit calculates an image feature amount for the reduced image. In step S1402, the detection processing unit then acquires an image feature amount at a specific position where detection processing is performed. In step S1403, the detection processing unit determines an object-like feature from the image feature amount of the reduced image serving as a processing target to calculate a detection score using a detector dictionary. In step S1404, the detection processing unit determines whether the process in step S1403 for calculating the detection score at each position in the image has been performed for the entire image while changing a determination position to search the entire image. If the process in step S1403 has been performed for the entire image (YES in step S1404), the processing proceeds to step S1406. If the process in step S1403 has not yet been performed (NO in step S1404), the processing returns to step S1402. By the processes from step S1402 to step S1404, the detection score at each position in the image is obtained. In step S1405, the detection processing unit performs threshold value processing for leaving a result having a detection score of a predetermined value or more, to delete a useless detection result. As a result of the process in step S1405, positional information about a position having a relatively high detection score in the image and the detection score are output from each of the detection processing units 111 to 11n. In step S1406 at the end of the loop, the detection processing unit increments a hierarchy number L by one, and the processing proceeds to step S1408 at the head of the loop. The foregoing processing enables objects of a plurality of sizes to be detected using a detector capable of detecting only one size.

Processing performed by preparing two head detectors will be described below. H images of a head are first prepared, and are resized to two sizes. Head images in one group are unified by pixels having the head width $w_1$, and head images in the other group are unified by pixels having the head width $w_2$. $w_1$ and $w_2$ are previously determined values, where $w_1 \neq w_2$. The head images composed of the pixels having the width $w_1$ are used for learning, to generate one head detector H1. The head images composed of the pixels having the width $w_2$ are used for learning, to generate the other head detector H2. Thus, when there is a head image of a certain size, and the head detector H1 is used, the detection output unit outputs a maximum score in a hierarchy number $L_1$ in the detection processing illustrated in FIG. 13. In this case, when the head detector $H_2$ is used, the detection processing unit is more likely to output the maximum score in the hierarchy number $L_1$-$\text{Log}_r$ $(w_2/w_1)$.

A method for estimating a head position using the head detectors will be described below. First, a large number of image samples respective head positions of which are known are prepared, as illustrated in FIG. 6A. The images illustrated in FIG. 6A are subjected to the head detector. As a result of the detection, the head detector sequentially performs detection processing for the entire image, similarly to the detection processing illustrated in FIG. 13. Suppose a detection result having the highest head detection score in a g-th (g=1, ..., G) image is at a position $(x_g, y_g)$ on the image and in a hierarchy number $L_g$. Since only one person appears in an image 600, a detection result 611 having the highest score can be a head. A head correct answer position at this time is represented by a rectangle $(x_{0,g}, y_{0,g}, x_{1,g}, y_{1,g})$. When all head images are subjected to the above-mentioned processing, matrices $X_H$ and $X_D$ expressed by the following equation (10) are obtained. Head correct answer positions are arranged in the matrix $X_H$, and head detection positions and logarithms of size are arranged and a constant 1 is added to the last column in the matrix $X_D$.

$$X_H = \begin{bmatrix} x_{0,1} & y_{0,1} & x_{1,1} & y_{1,1} \\ x_{0,2} & y_{0,2} & x_{1,2} & y_{1,2} \\ x_{0,3} & y_{0,3} & x_{1,3} & y_{1,3} \\ \vdots & \vdots & \vdots & \vdots \\ x_{0,G} & y_{0,G} & x_{1,G} & y_{1,G} \end{bmatrix}, X_D \begin{bmatrix} x_1 & y_1 & \log L_1 & 1 \\ x_2 & y_2 & \log L_2 & 1 \\ x_3 & y_3 & \log L_3 & 1 \\ \vdots & \vdots & \vdots \\ x_G & y_G & \log L_G & 1 \end{bmatrix} \quad (10)$$

Consequently, a linear coefficient B is found by the following equation (11):

$$B = X_D \backslash X_H \quad (11)$$

Here, a symbol of operation "\" represents left division. One estimation parameter B is prepared per head detector. If the head detector detects a head in coordinates (x, y) on an image and a hierarchy number L, therefore, a head position $(x_{h1}, y_{h1}, x_{h2}, y_{h2})$ is estimated by the following equation:

$$X_h = (x_{h1}, y_{h1}, x_{h2}, y_{h2}) = (x, y, \log L, 1)B \quad (12)$$

The processing by the merging result output unit 151 in the first exemplary embodiment is then performed using the two head detectors having different features, to collect detection results of the two head detectors.

A method for merging the detectors having different features while having the same detection target has been described above. Particularly in the fourth exemplary embodiment, outputs of the head detectors, which are detected in different hierarchies, are collected using a pyramid image, to output one detection result.

An object detection apparatus used as a part of an inspection apparatus will be described below as a fifth exemplary embodiment. In a factory into which the inspection apparatus is introduced, work for drilling a hole by human work at the center of a wood having a rectangular shape is performed. However, since the drilling a hole on a wood is performed by a human, a position at which the hole is drilled is not necessarily correct. Therefore, the inspection apparatus is introduced, to evaluate the quality of the wood. The evaluation of the quality of the wood is determined depending on whether the position of the hole on the wood is within a predetermined range, to use the wood as a shipping target if the position of the hole is within the range and use the wood as a recycle target if the position of the hole is outside the range. Since the hole is drilled on the wood, specifying the position of the hole by image processing is not necessarily correct. Particularly when a detector for searching for a simple circular pattern is used, a portion other than the hole may be erroneously determined to be a hole because of a pattern of the wood (a pith and a knot). Therefore, only circular detection in the vicinity of a position to be expected needs to be effective.

Figure 14:
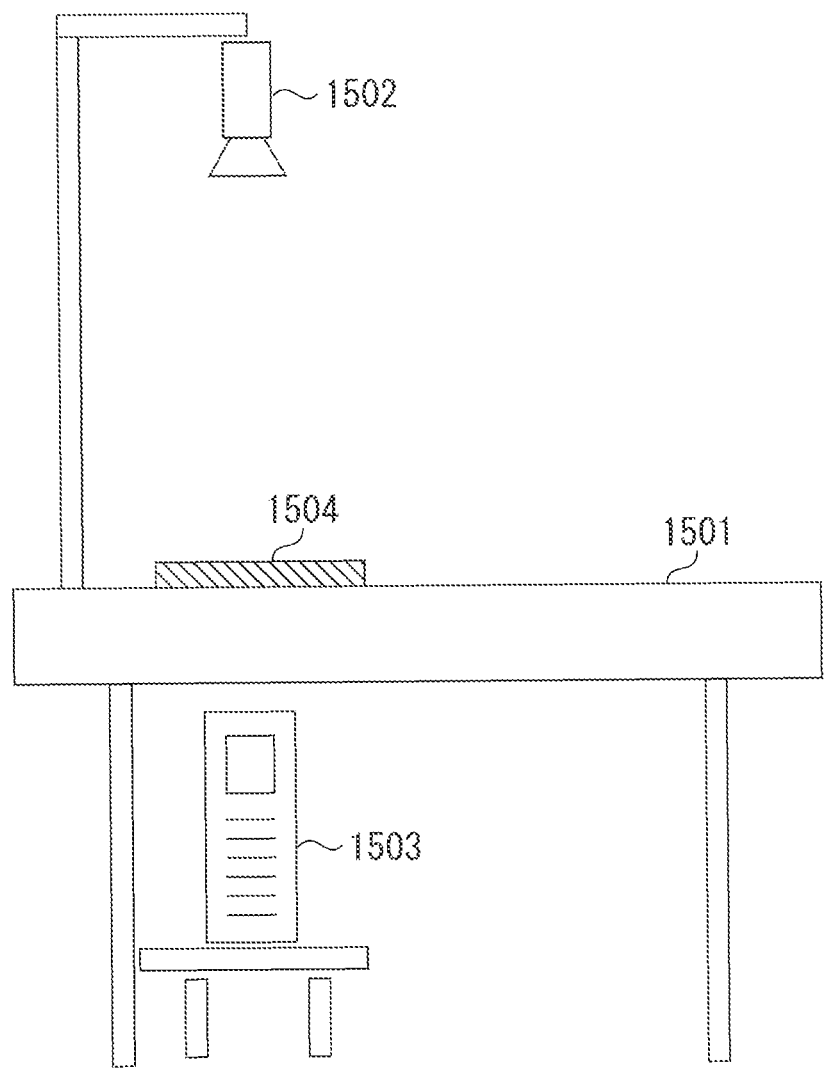
FIG. 14 illustrates an inspection apparatus.
Figure 15:
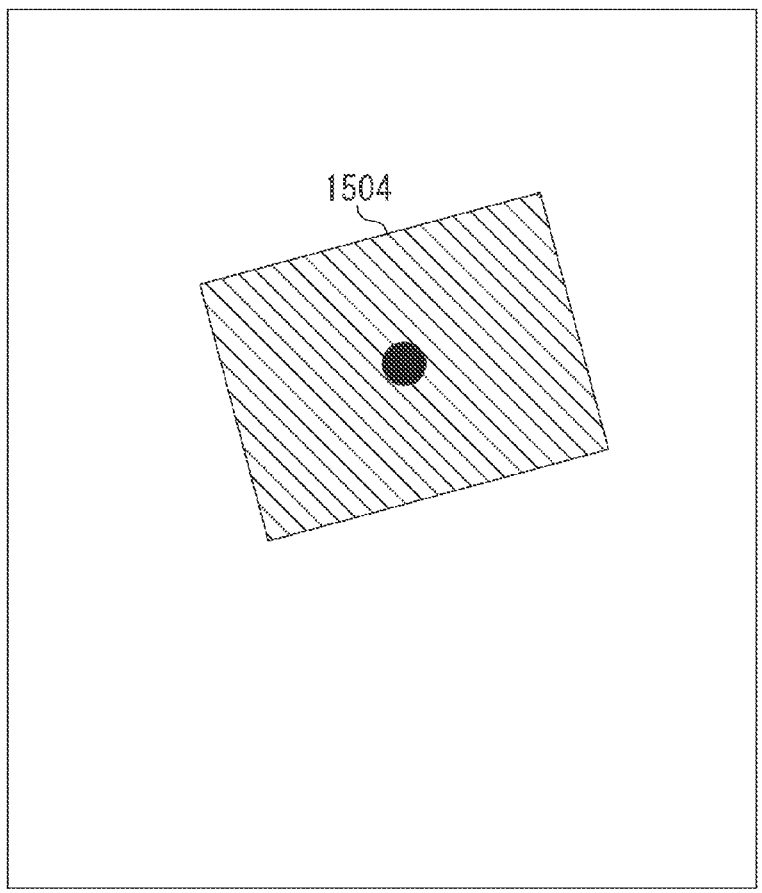
FIG. 15 illustrates how a wood appears on a belt conveyer.

The inspection apparatus includes a belt conveyer 1501, a camera 1502, and a computer 1503, as illustrated in FIG. 14, and the computer 1503 and the camera 1502 are connected to each other with a communication cable. To improve a image-capturing condition of a subject, as needed, illumination equipment is also separately prepared. A wood 1504 with a hole is put on the belt conveyer 1501, and its image is captured by the camera 1502. The image captured by the camera 1502 is as illustrated in FIG. 15, for example. The wood 1504 may be arranged in various horizontal directions. However, a surface, on which the hole can be seen, of the wood 1504 appears in the camera 1502. Woods 1504 are placed at intervals on the belt conveyer 1501 so that only one of them is image-captured at one time.

Figure 16A:
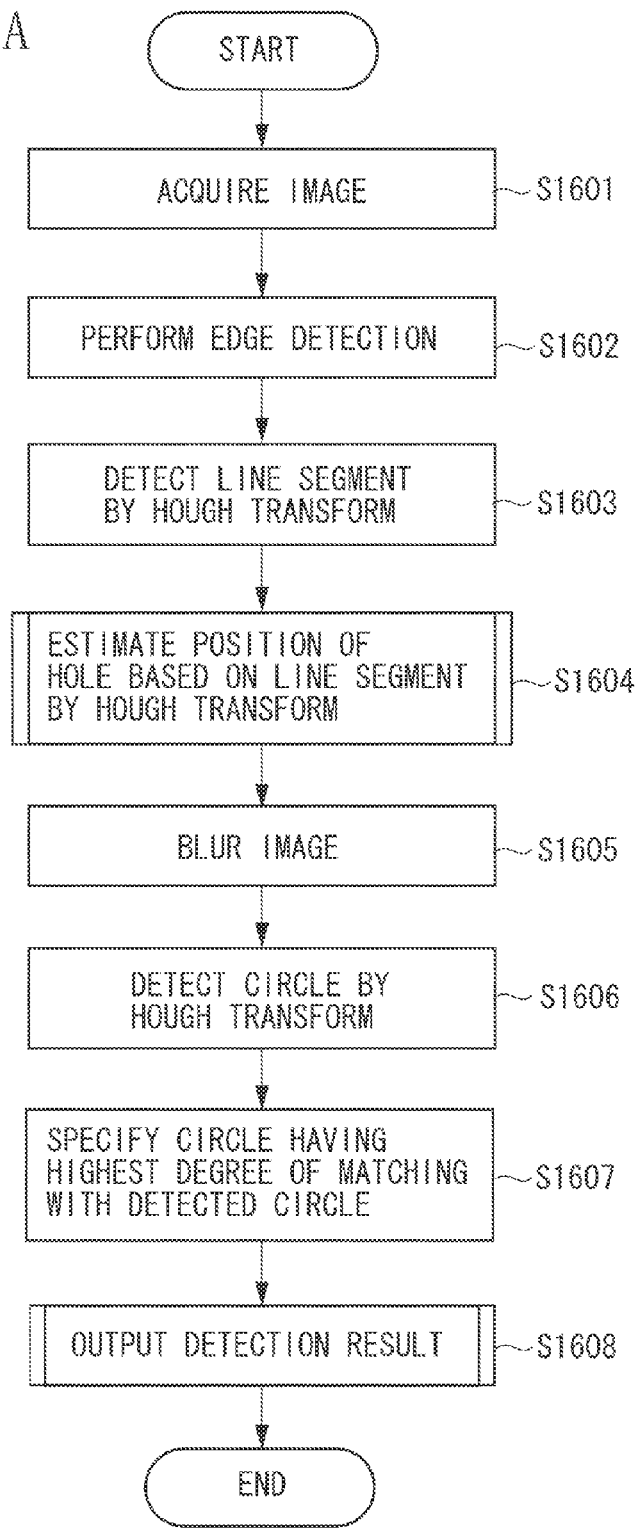
Figure 17:
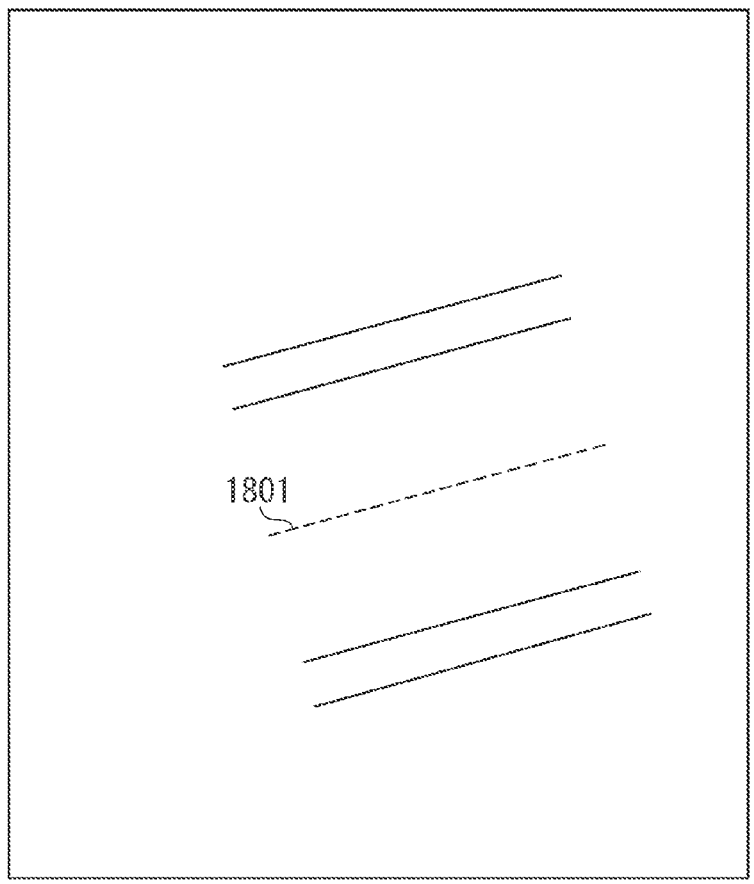
FIG. 17 illustrates a vote from line segments.
Figure 18:
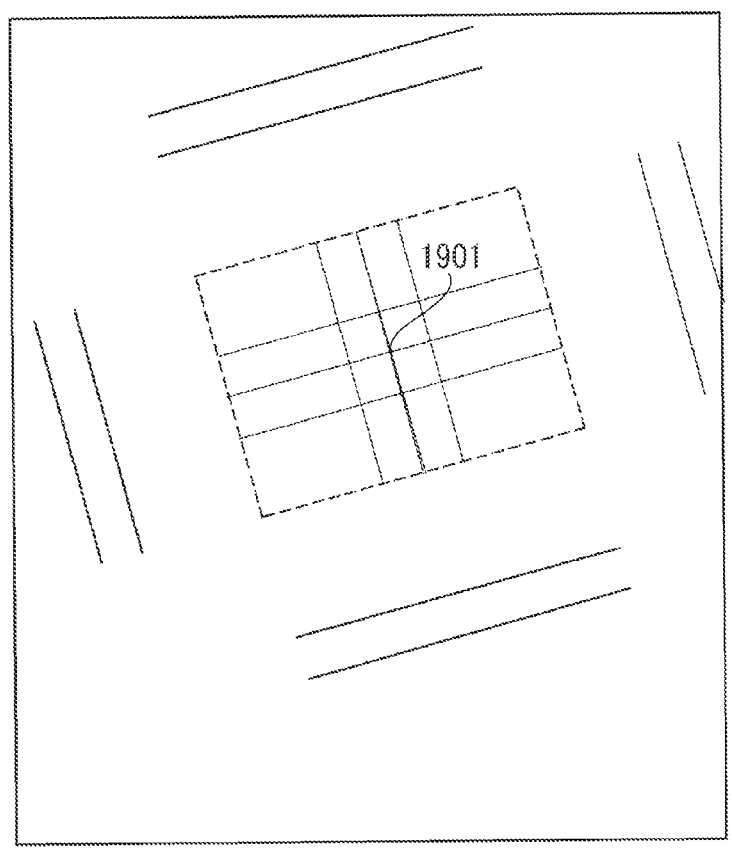
FIG. 18 illustrates a summed image.

FIG. 16A illustrates a processing flow of an object detection apparatus that receives such an image as input. In step S1601, the object detection apparatus first acquires an image from the camera 1502. In step S1602, the object detection apparatus detects an edge for the image. For example, a Canny Edge Detector prepared in an Open Computer Vision Library (OpenCV) (see http://opencv.willowgarage.com/wiki/) can be used. In step S1603, the object detection apparatus detects a line segment by Hough transform using an obtained black-and-white image. When probabilistic Hough transform in the OpenCV is used, a list of obtained line segments is obtained. In step S1604, the object detection apparatus then estimates a position of a hole based on each of the obtained line segments. FIG. 16B is a detailed flowchart of the estimation. A loop from step S1609 to step S1611 is repeated for each of the line segments. In step S1610, the object detection apparatus first generates an image drawn by shifting a position of each of the line segments. FIG. 17 illustrates an image generated in step S1610 from one line segment 1801 obtained from the input image illustrated in FIG. 15. A broken line 1801 is a line segment that is not drawn in the generated image, although illustrated for reference. The line segments to be drawn are arranged parallel to each other at distances W/2 and H/2 on both sides of the line segment 1801. W and H are the width and the height of a wood, where W≥H. In step S1611, the object detection apparatus then blurs the obtained image. The blurred image is hereinafter referred to as a voted image. Gaussian Blur in the OpenCV can be used for the blur. After voted images are generated for all the line segments, the processing proceeds to step S1612. In step S1612, the object detection apparatus generates an image obtained by summing the voted images (a summed image). In step S1613, the object detection apparatus then obtains a position $(x_{max}, y_{max})$ of a pixel having the largest value in the summed image. This position is an estimated position of a hole. FIG. 18 illustrates an image of the summed image for the input image illustrated in FIG. 15. To avoid the input image being a gray scale image, a blur effect is not illustrated. A broken line is a line segment illustrated for reference, like in FIG. 17. The summed image takes the maximum value at a point 1901 because a vote from a total of four line segments is effective. Referring to FIG. 16A again, in step S1605, the object detection apparatus blurs the input image. In step S1606, the object detection apparatus then detects a circle by Hough transform. A circle detection algorithm in the OpenCV can be used to detect the circle. A center position ($x_c$, $y_c$) and a radius $r_c$ are obtained for the detected c-th circle. In step S1607, the object detection apparatus then obtains a degree of matching between the circles based on the following equation (13) for each of the circles, to specify, out of the circles, the circle having the highest degree of matching with the detected circle:

$$A_2(c) = -(x_c - x_{max})^2 - (y_c - y_{max})^2 - K(r_c - r_{exp})^2 \tag{13}$$

Figure 16C:
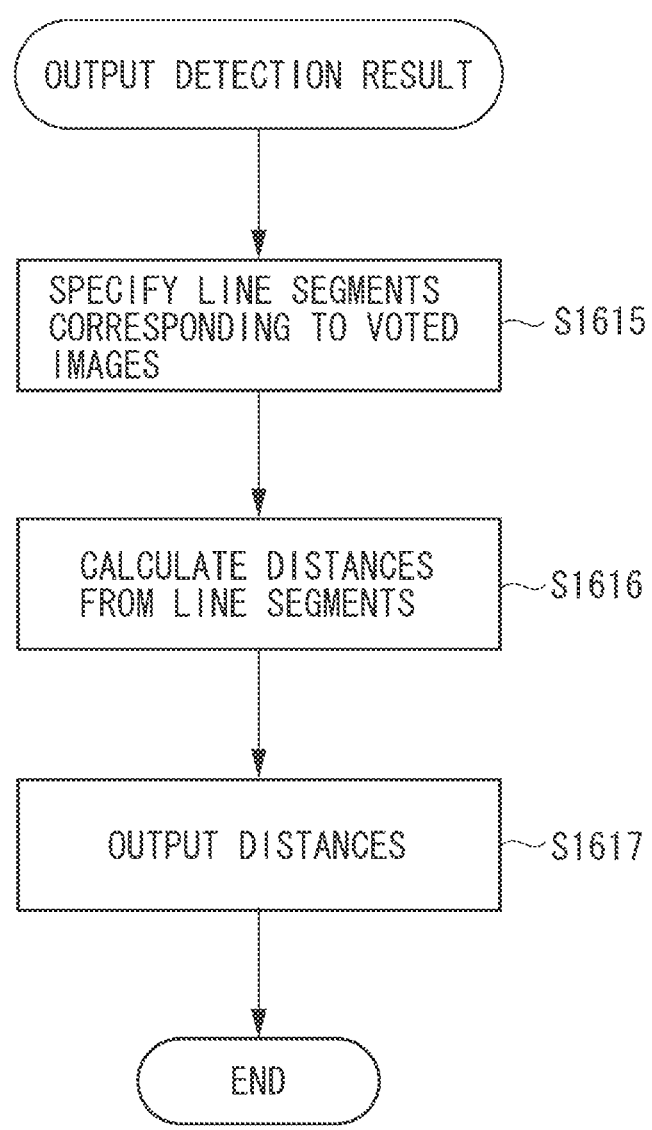

Here, $r_{exp}$ is a radius to be expected, and K is an adjustment parameter. A value of c at which $A_2(c)$ reaches a maximum is defined as m. Consequently, a circle detection result is a position ($x_m$, $y_m$). In last step S1608, the object detection apparatus outputs the detection result. Details thereof are illustrated in FIG. 16C. A pixel value in each of the voted images at the position ($x_{max}$, $y_{max}$) can indicate which of the line segments has contributed to estimation of the position of the hole. In step S1615, the object detection apparatus first determines, out of the voted images, the four voted images in descending order of their pixel values at the position ($x_{max}$, $y_{max}$), and specifies the line segments respectively corresponding to the voted images. In step S1616, the object detection apparatus can find four distances to each of the line segments from the position ($x_m$, $y_m$). In step S1617, the object detection apparatus outputs a vector ($d_1$, $d_2$, $d_3$, $d_4$) obtained by sorting the distances in descending order. The vector is desirably close to (W, W, H, H).

Finally, the object detection apparatus obtains two error values expressed by the following equation (14) using the distance vector. If both the error values are less than a predetermined threshold value θ, the wood may be used as a shipping target:

$$Q_W = |d_1 - W| + |d_2 - W|, \quad Q_H = |d_3 - H| + |d_4 - H| \tag{14}$$

In the foregoing exemplary embodiments, detection information has been estimated by Hough transform, to detect a hole. Particularly in the present exemplary embodiment, an example of an apparatus that defines detection information as a position and a size of a hole of a wood and detects the hole of the wood using two different detectors for detecting line segments and circles has been illustrated.

According to each of the above-mentioned exemplary embodiments, if results of a plurality of different detectors are merged, common information with a high accuracy of an estimation result is estimated, and a final detection result is obtained using the estimation result. Thus, erroneous detection appearing in a region other than a region serving as a detection target can be reduced, so that a highly accurate detection result can be obtained.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2012-082380 filed Mar. 30, 2012, which is hereby incorporated by reference herein in its entirety.

What is claimed is:

1. An object detection apparatus comprising:
at least one processor and at least one memory coupled to each other and cooperating to act as:
a first detection unit configured to detect a first portion of an object from an input image;
a second detection unit configured to detect a second portion different from the first portion of the object from the input image;
a first estimation unit configured to estimate a third portion different from the first portion and the second portion of the object based on the first portion when the first detection unit detects the first portion;
a second estimation unit configured to estimate a fourth portion different from the first portion and the second portion of the object based on the second portion when the second detection unit detects the second portion;
a first score correction unit configured to correct the third portion with a correction coefficient based on the first detection unit;
a second score correction unit configured to correct the fourth portion with a correction coefficient based on the second detection unit;
a determination unit configured to determine whether the third portion and the fourth portion, which have been respectively estimated by the first and second estimation units, meet a predetermined condition; and
an output unit configured to output, if the determination unit determines that the third portion and the fourth portion meet a predetermined condition, a detection result of the object based on at least one of a detection result of the first or second detection unit and an estimation result of the first or second estimation unit,
wherein the determination unit calculates a degree of matching between the third portion and the fourth portion respectively estimated by the first and second estimation units based on a ratio of overlapping of the third portion and the fourth portion respectively estimated by the first and second estimation units, and determines, if the degree of matching is a predetermined threshold value or more, that the third portion and the fourth portion respectively estimated meet the predetermined condition, and
wherein the first portion includes the third portion, and third portion includes the second portion,
wherein the correction coefficient depends upon an estimation performance of the first estimation unit and the second estimation unit of a common area which corresponds to the third portion and the fourth portion.

2. The object detection apparatus according to claim 1, wherein the output unit merges and outputs the detection results of the first and second detection units.

3. The object detection apparatus according to claim 1, wherein the first and second detection units detect a position and a size of the object.

4. The object detection apparatus according to claim 1, wherein the first and second detection units respectively calculate and output, together with the detection results, scores representing likelihoods of the detection results.

5. The object detection apparatus according to claim 4, wherein the output unit outputs the linear sum of the scores respectively calculated by the first and second detection units.

6. The object detection apparatus according to claim 4, further comprising:
a correction unit configured to correct at least one of the scores respectively output from the first and second detection units based on reliabilities of the first and second estimation units.

7. The object detection apparatus according to claim 6, wherein the first and second detection units respectively output detection results representing the corrected scores of predetermined values or more.

8. The object detection apparatus according to claim 6, wherein the output unit outputs the linear sum of the scores corrected by the correction unit.

9. The object detection apparatus according to claim 1, wherein the object is a human body, and the first and second detection units detect any one of the entire body, the upper body, the head, and the face of the human body.

10. The object detection apparatus according to claim 9, wherein the first and second estimation units respectively estimate the head of the human body.

11. The object detection apparatus according to claim 1, wherein the second detection unit detects a plurality of second portions, the second estimation unit respectively estimates fourth portions from the plurality of second portions, the determination unit calculates a degree of matching for each of the fourth portions estimated by the second estimation unit, and the output unit outputs a second portion used to estimate the fourth portion of which the degree of matching is highest and not lower than the threshold value.

12. An object detection method comprising:
detecting a first portion of an object from an input image;
detecting a second portion different from the first portion of the object from the input image;
estimating a third portion different from the first portion and the second portion of the object based on the first portion when the first portion is detected;
estimating a fourth portion different from the first portion and the second portion of the object based on the second portion when the second portion is detected;
correcting the third portion with a correction coefficient based on the first detection unit;
correcting the fourth portion with a correction coefficient based on the second detection unit;
determining whether the estimated third portion and the fourth portion meet a predetermined condition; and
outputting, if it is determined that the third portion and the fourth portion meet the predetermined condition, a detection result of the object based on at least one of a detection result and an estimation result,
wherein the determining step calculates a degree of matching between the third portion and the fourth portion respectively estimated based on a ratio of overlapping of the third portion and the fourth portion respectively estimated, and determines, if the degree of matching is a predetermined threshold value or more, that the third portion and the fourth portion respectively estimated meet the predetermined condition, and
wherein the first portion includes the third portion, and the third portion includes the second portion,
wherein the correction coefficient depends upon an estimation performance of the first estimation unit and the second estimation unit of a common area which corresponds to the third portion and the fourth portion.

13. A non-transitory storage medium storing a program for causing a computer to execute the object detection method according to claim 12.

14. The object detection apparatus according to claim 1, wherein the first portion is the entire body, the second portion is the face, the third portion is the head.

* * * * *